United States Patent
Park

(10) Patent No.: US 6,270,441 B1
(45) Date of Patent: Aug. 7, 2001

(54) GEAR TRAIN FOR AUTOMATIC TRANSMISSIONS

(75) Inventor: Jong-Sool Park, Suwon (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/466,213

(22) Filed: Dec. 17, 1999

(30) Foreign Application Priority Data

Jul. 8, 1999 (KR) .................................................. 99-27509

(51) Int. Cl.$^7$ .................................. F16H 3/62; F16H 3/66
(52) U.S. Cl. ............................................................. 475/282
(58) Field of Search .................................. 475/282, 311, 475/317, 271, 295, 296

(56) References Cited

U.S. PATENT DOCUMENTS

| 5,890,988 | * | 4/1999 | Kasuya et al. | 475/317 X |
| 5,997,429 | * | 12/1999 | Raghavan et al. | 475/311 X |
| 6,146,305 | * | 11/2000 | Hebbale et al. | 475/284 |

FOREIGN PATENT DOCUMENTS

| 0305045 | * | 1/1989 | (EP) . | |
| 62-93544 | * | 4/1987 | (JP) . | |
| 64-12160 | * | 1/1989 | (JP) . | |
| 1-55454 | * | 3/1989 | (JP) | 475/282 |
| 4-15338 | * | 1/1992 | (JP) . | |
| 4-25648 | * | 1/1992 | (JP) | 475/282 |

* cited by examiner

Primary Examiner—Charles A Marmor
Assistant Examiner—Ankur Parekh
(74) Attorney, Agent, or Firm—Finnegan, Henderson, Farabow, Garrett & Dunner, L.L.P.

(57) ABSTRACT

A gear train for an automatic transmission a first planetary gear set includes a first element variably connected to an input shaft, a second element variably connected to the first element, the input shaft and a transmission housing, and a third element connected to a transfer shaft to transmit power the transfer shaft, a second planetary gear set comprising a fourth element variably connected to the input shaft and the transmission housing, a fifth element fixedly connected to the first element of the first planetary gear set, and a sixth element connected to the transfer shaft to transmit power to the transfer shaft, and a plurality of friction elements for variably connecting the first, second, and fourth element to either the input shaft or the transmission housing.

8 Claims, 4 Drawing Sheets

| Friction Element<br>Shift Range | C1 | C2 | C3 | B1 | B2 |
|---|---|---|---|---|---|
| D1 | O | | | O | |
| D2 | O | | | | O |
| D3 | O | O | | | |
| D4 | O | | O | | |
| D5 | | O | O | | |
| D6 | | | O | | O |
| R1 | | O | | O | |

GEAR TRAIN FOR AUTOMATIC TRANSMISSIONS

BACKGROUND OF THE INVENTION (a) Field of the Invention

The present invention relates to a gear train for an automatic transmission used in vehicles. More particularly, the invention relates to a gear train for a 6-forward speed and 1-reverse speed automatic transmission.

(b) Description of the Related Art

Generally, automatic transmission systems for vehicles are provided with a transmission control unit (TCU) which automatically controls shift ratios according to changes in a running condition of the vehicle.

The typical TCU controls a plurality of friction elements provided in a gear train to either operative or inoperative states to select one of the three essential elements of a planetary gear set (i.e., a sun gear, a ring gear, or a planetary carrier) to be an input element, a reaction element, or an output element, thereby controlling an output number of revolutions.

Particularly, a gear train that can realize 6-forward speeds and 1-reverse speed comprises a plurality of heavy and large-sized clutches and brakes and a plurality of inoperative friction elements, resulting in deterioration of power and space efficiencies.

SUMMARY OF THE INVENTION

Therefore, the present invention has been made in an effort to solve the above problems.

It is an object of the present invention to provide a gear train for an automatic transmission that is lightweight and compact in size, while at the same time providing improved power efficiency.

To achieve the above object, the present invention provides a gear train for an automatic transmission a first planetary gear set comprising a first element variably connected to an input shaft, a second element variably connected to the first element, the input shaft and a transmission housing, and a third element connected to a transfer shaft to transmit power the transfer shaft, a second planetary gear set comprising a fourth element variably connected to the input shaft and the transmission housing, a fifth element fixedly connected to the first element of the first planetary gear set, and a sixth element connected to the transfer shaft to transmit power to the transfer shaft; and friction means for variably connecting the first, second, and fourth element to either the input shaft or the transmission housing.

Preferably, the first planetary gear set is a single pinion planetary gear set. The first element is a sun gear, the second element is a ring, and the third element is a carrier.

Preferably, the second planetary gear set is a single pinion planetary gear set. The fourth element is a sun gear, the fifth element is a ring gear, and the sixth element is a carrier.

As the friction means, a first clutch is interposed between the input shaft and the combination of the first sun gear and the second ring gear, a second clutch is interposed between the second sun gear and the input shaft, a third clutch is interposed between the first ring gear and the input shaft. In addition, a first brake is interposed between the first ring gear and the transmission housing, and a second brake is interposed between the transmission housing and the second sun gear.

A first speed is realized by operating the first clutch and the first brake, a second speed is realized by operating the first clutch and the second brake, a third speed is realized by operating the first and second clutches, a fourth speed is realized by operating the first and third clutches, a fifth speed is realized by the second and third clutches, a sixth speed is realized by operating the third clutch and the second brake, and a reverse speed is realized by operating the second clutch and the first brake.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figures 1, 2:
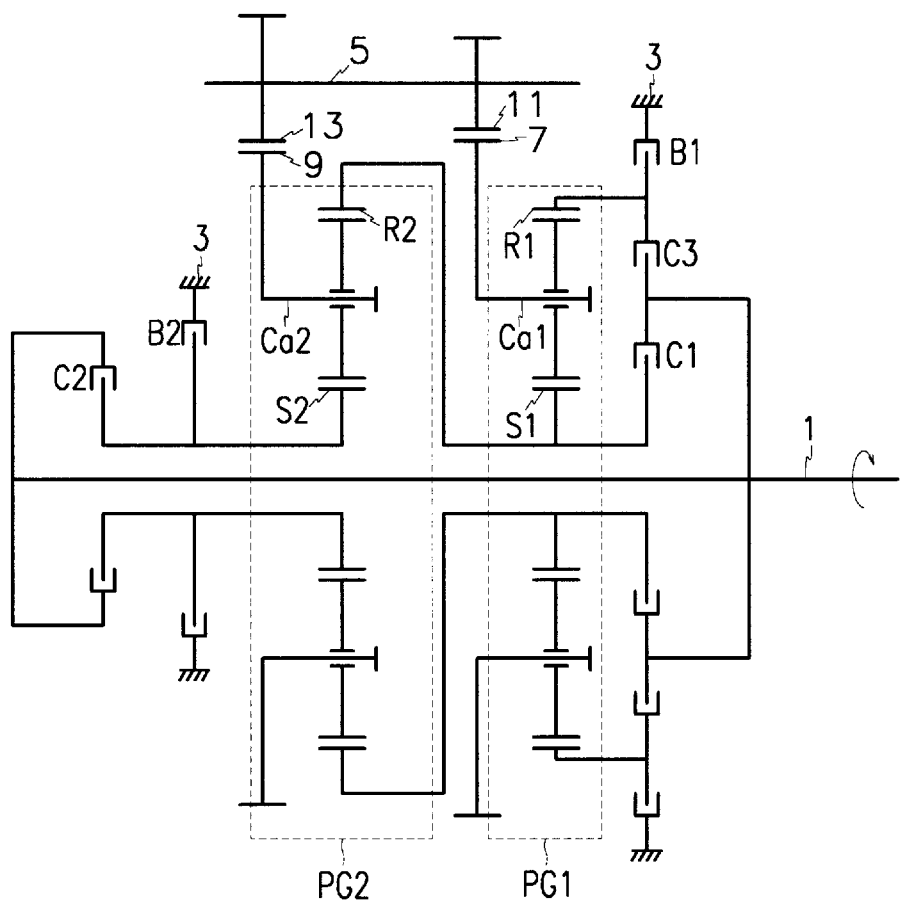
FIG. 1 is a schematic diagram of a gear train for an automatic transmission according to a preferred embodiment of the present invention.
FIG. 2 is an operational chart of friction elements in each shift range according to a preferred embodiment of the present invention.

FIG. 1 shows a schematic diagram of a gear train according to a preferred embodiment of the present invention.

The inventive gear train comprises first and second planetary gear sets PG1 and PG2 that are disposed around an input shaft 1. The first planetary gear set PG1 is a double pinion type, which comprises a sun gear S1 variably connected to the input shaft 1, a ring gear R1 variably connected to the sun gear S1, the input shaft 1 and a transmission housing 3, and a planet carrier Ca1 connected to a transfer shaft 5 to transmit power thereto.

The second planetary gear set PG2 is a single pinion type, which comprises a sun gear S2 variably connected to the input shaft 1 and the S transmission housing 3, a ring gear R2 fixedly connected to the sun gear S1 of the first planetary gear set PG1, and a planet carrier Ca2 connected to the transfer shaft 5 to transmit power thereto.

For the above described variable connections, a first clutch C1 is interposed between the input shaft 1 and the combination of the sun gear S1 of the first planetary gear set PG1 and the ring gear R2 of the second planetary gear set PG2, a second clutch C2 is interposed between the sun gear S2 of the second planetary gear set PG2 and the input shaft 1, and a third clutch C3 is interposed between the ring gear R1 of the first planetary gear set PG1 and the input shaft 1.

In addition, a first brake B1 is interposed between the ring gear R1 of the first planetary gear set PG1 and the transmission housing 3, and a second brake B2 is interposed between the transmission housing 3 and the sun gear S2 of the second planetary gear set PG1.

As a result of the above, through the selective operation of the first, second, and third clutches C1, C2, and C3 and the first and second brakes B1 and B2, five (6) forward speeds and one (1) reverse speed are realized and transmitted to the transfer shaft 5 through the carriers Ca1 and Ca2 of the respective first and second planetary gear sets PG1 and PG2. The selective operation of the friction elements is controlled by the TCU. First and second transfer drive gears 7 and 9 respectively fixed on the first and second planetary gear sets PG1 and PG2 are respectively engaged with first and second transfer driven gears 11 and 13 of the transfer shaft 5 with predetermined gear ratios.

That is, the friction elements are operated in each speed as shown in the friction elements operation chart of FIG. 2. The shift process will be explained hereinafter using the operation chart of FIG. 2 and the lever analogy diagrams of FIGS. 3 to 9, in which the first and second planetary gear sets PG1 and PG2 are represented by first to sixth levers L1 to L6.

The first to fifth nodes N1 to N5 located on each lever denotes each element of the first and second planetary gear sets PG1 and PG2. That is, the first node N1 denotes the sun gear S2 of the combination of the sun gear S1 of the first planetary gear set PG1 and the ring gear R2 of the second planetary gear set PG2, the second node N2 denotes the carrier Ca2 of the second planetary gear set PG2, the third node N3 denotes the carrier Ca1 of the first planetary gear set PG1, the fourth node N4 denotes the ring gear R1 of the first planetary gear set PG1, and the fifth node N5 denotes the sun gear S2 of the second planetary gear set PG2.

First-foward Speed

A speed ratio of the first-forward speed will be explained hereinafter with reference to FIG. 3.

When the first clutch C1 and the first brake B1 are operated by the TCU as shown in FIG. 2, the third and fourth nodes N3 and N4 become the output elements, the fifth node N5 becomes the reacting element, and the first node N1 operates as the input element.

It is assumed that an output speed of the third node N2 is represented as being fixed at "1," and an output speed of the fourth node N3 is lower than the output speed "1" of the third node N3 at a predetermined ratio.

Figure 3:
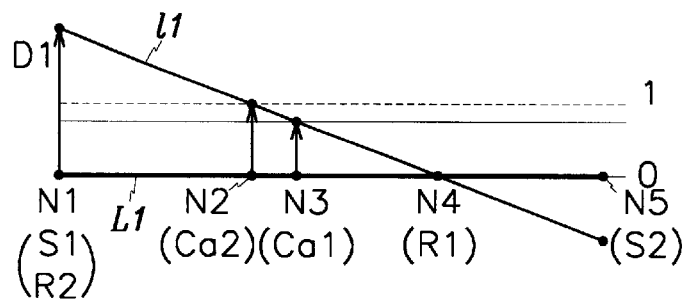
FIG. 3 is a view for illustrating a shift ratio of a first speed according to a preferred embodiment of the present invention through a lever analogy method.
Figure 4:
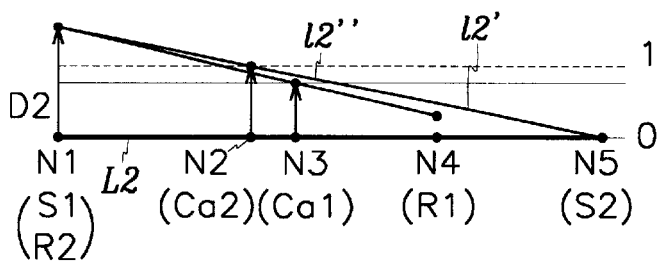
FIG. 4 is a view for illustrating a shift ratio of a second speed according to a preferred embodiment of the present invention through a lever analogy method.
Figure 5:
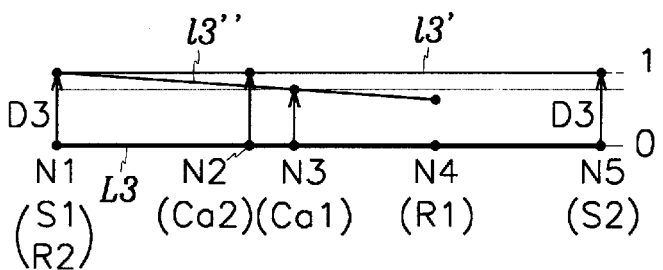
FIG. 5 is a view for illustrating a shift ratio of a third speed according to a preferred embodiment of the present invention through a lever analogy method.
Figure 6:
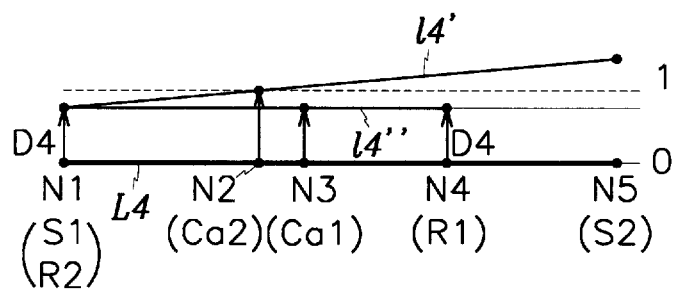
FIG. 6 is a view for illustrating a shift ratio of a fourth speed according to a preferred embodiment of the present invention through a lever analogy method.
Figure 7:
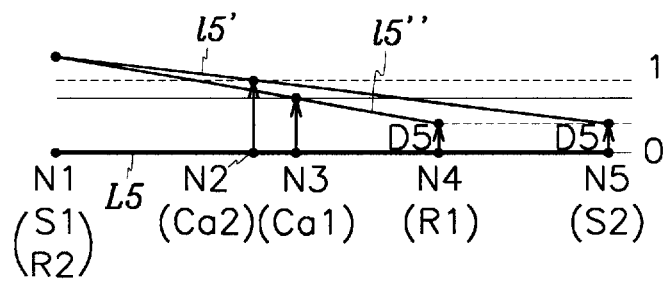
FIG. 7 is a view for illustrating a shift ratio of a fifth speed according to a preferred embodiment of the present invention through a lever analogy method.
Figure 8:
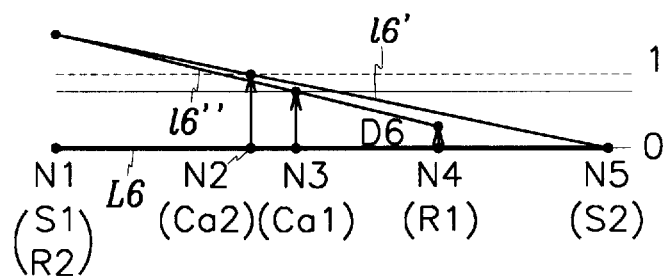
FIG. 8 is a view for illustrating a shift ratio of a sixth speed according to a preferred embodiment of the present invention through a lever analogy method.
Figure 9:
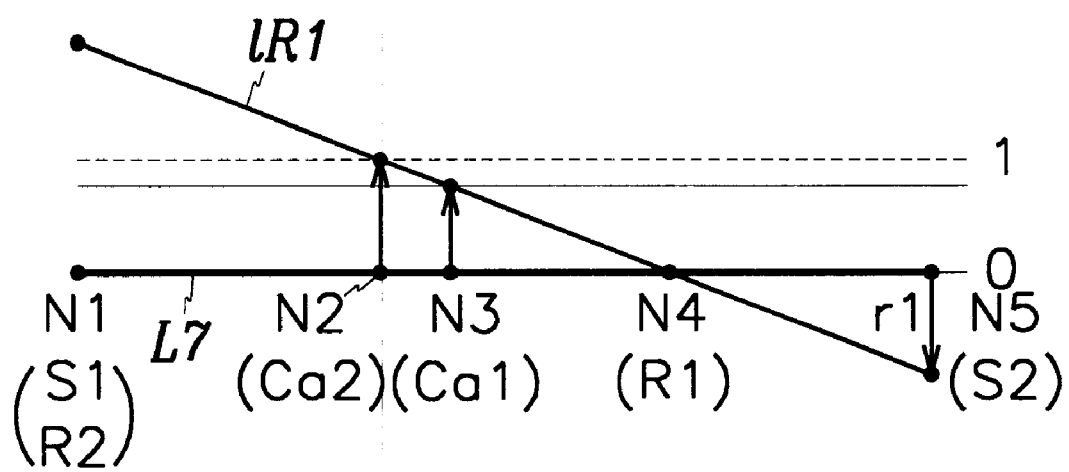
FIG. 9 is a view for illustrating a shift ratio of a reverse speed according to a preferred embodiment of the present invention through a lever analogy method.

Accordingly, an extended line connecting the output speed "1," outputted from the output node N2, to the reacting node N4 becomes a first-forward speed line 11 in FIG. 3.

Therefore, a line vertically connecting the input node N1 to the first speed line 11 becomes a first input speed line D1. The first input speed line D1 is higher than the output speed "1."

Accordingly, it is noted that an output number of rotations is much smaller than an input number of rotations, and a reduction in speed is realized through a first speed shift ratio. In addition, it is further noted that the sun gear S2 of the fifth node N5 rotates in a reverse direction to other elements.

Second-forward Speed

In the above first-forward speed state, if vehicle speed and throttle opening are increased, the TCU disengages the first brake B1 and operates the second brake B2 as shown in the operation chart of FIG. 2. Accordingly, in the second lever L2 shown in FIG. 4, the second and third nodes N2 and N3 become output elements, the fifth node N5 becomes the reacting element, and the first node becomes the input element.

It is still assumed that an output speed of the third node N2 is fixed at "1," and an output speed of the fourth node N3 is lower than the output speed "1" of the third node N3 at a predetermined ratio.

Therefore, an extended line connecting the output speed "1", outputted from the second node N2, to the reacting node N5 becomes a first second-forward speed line I2'.

Accordingly, a line vertically connecting the input node N1 to the second-forward speed line I2' becomes the second input speed line D2.

In addition, an extended line connecting the input speed of the first node N1 to the output speed of the third node N3 becomes a second second-forward speed line I2".

Accordingly, it is noted that the second input speed line D2 is higher than the output speed "1," but it is lower than the first input speed line D1.

It is further noted that the rotation speed of the ring gear R1 denoted by the fourth node N4 is lower than the output speed of carrier Ca1 denoted by the third node N3.

Third Forward Speed

In the above second-forward speed state, if vehicle speed and throttle opening are increased, the TCU disengages the second brake B2, and operates the second clutch C2. Accordingly, in the third lever L3 shown in FIG. 5, the second and third nodes N2 and N3 operate as the output elements, and the first and fifth node N1 and N5 become the input elements, the first node N1 also functions as a semi-reacting element.

It is still assumed that an output speed of the second node N2 is fixed at "1," and an output speed of the third node N3 is lower than the output speed "1" of the second node N2.

It is further assumed that input speeds of the first and fifth nodes N1 and N5 are the same as the output speed "1" of the second node.

Therefore, an extended line connecting the output speed "1" of the second node N2 to the input speeds of the first and fifth nodes N1 and N5 becomes a first third-forward speed line I3'. Additionally, an extended line connecting the output speed of the third node N3 to the input speed of the first speed N1 becomes second third-forward speed line I3".

Here, a line vertically connecting the first and fifth nodes N1 and N5 to the first third-forward speed line I3" represents the third-forward input speed line D3.

That is, it is noted that the input number of rotations in the third forward speed becomes the same as the output number of rotations. Therefore, there is not reduction in speed.

Fourth-forward Speed

In the above third speed state, if vehicle speed and throttle opening are increased, the TCU disengages the second clutch C2 and operates the third clutch C3. Accordingly, in the fourth lever L4 shown in FIG. 6, the second and third nodes N2 and N3 operate as the output elements, and the first and fourth nodes N1 and N4 become the input elements, the first node N1 also functions as a semi-reacting element.

It is still assumed that an output speed of the second node N2 is fixed at "1," and an output speed of the third node N3 is lower than the output speed "1" of the second node N2 at a predetermined ratio.

It is further assumed that input speeds D4 of the first and fourth nodes are the same as the output speed of the third node N3.

Therefore, an extended line connecting the input speeds of the first and fourth nodes N1 and N4 to the output speed of the third node N3 becomes the first forth-forward speed line I'. In addition, an extended line connecting the input speed of the first node N1 to the output speed "1" of the second node N2 becomes a second fourth-forward speed line I".

Here, the vertical lines connecting the first and fourth nodes N1 and N2 to the first fourth-forward speed line I' become the fourth-forward input speed lines D4.

In the above, it is noted that an overdrive is achieved in which an output number of rotations is higher than an input number of rotations. At this point, the number of rotations of the sun gear S2 denoted by the fifth node N5 are higher than those of other elements.

Fifth-forward Speed

In the above fourth-forward speed state, if vehicle speed and throttle opening are increased, the TCU disengages the first clutch C1 and operates the second clutch C2. Accordingly, in the fifth lever L5 shown in FIG. 7, the second and third nodes N2 and N3 operate as the output elements, and the fourth and fifth nodes N4 and N5 become the input elements. At this point, the first node N1 functions as a semi-reacting element.

It is still assumed that an output speed of the second node N2 is fixed at "1," and an output speed of the third node N3 is lower than the output speed "1" of the second node N2 at a predetermined ratio.

It is further assumed that input speeds of the fourth and fifth nodes N4 and N5 are lower than the output speed of the third node N3.

Accordingly, an extended line connecting the output speed "1" of the output node N2 to the input speed D5 of the fifth node N5 becomes a first fifth-forward speed line I5' and an extended line connecting the output speed of the output node N3 to the input speed D5 of the fourth node becomes a second fifth-forward speed line I5".

In the above, it is noted that an overdrive higher than the fourth-forward speed is realized, and the number of rotations of the combination of the sun gear S1 and the ring gear R2 of the first node N1 is higher than those of other elements.

Sixth-forward Speed

In the above fourth-forward speed state, if vehicle speed and throttle opening are increased, the TCU disengages the second clutch C1 and operates the second brake B2. Accordingly, in the sixth lever L6 shown in FIG. 8, the second and third nodes N2 and N3 operate as the output elements, and the fourth node N4 becomes the input elements. The fifth node N5 becomes the reacting element and the first node N1 functions as a semi-reacting element.

It is still assumed that an output speed of the second node N2 is fixed at "1," and an output speed of the third node N3 is lower than the output speed "1" of the second node N2 at a predetermined ratio.

It is further assumed that input speeds of the fourth node are lower than the that in the fifth-forward speed.

Accordingly, an extended line connecting the output speed "1" of the output node N2 to the reacting node N5 becomes a first sixth-forward speed line I6' and an extended line connecting the output speed of the output node N3 to the input speed D6 of the fourth node becomes a second sixth-forward speed line I6".

In the above, it is noted that an overdrive higher than the fifth-forward speed is realized, and the number of rotations of the combination of the sun gear S1 and the ring gear R2 of the first node N1 is higher than those of other elements.

Reverse Speed

If the driver changes the selector lever to a reverse R range, the TCU controls the third clutch C3 and the second brake B2 to operate as shown in FIG. 2. Accordingly, in the seventh lever L7 shown in FIG. 9, the second and third nodes N2 and N3 operate as the output elements, and the fourth node N4 operates as the reacting element. The fifth node N5 functions as the input element.

It is still assumed that an output speed of the second node N2 is fixed at "1," and an output speed of the third node N3 is lower than the output speed "1" of the second node N2 at a predetermined ratio.

Accordingly, an extended line connecting the output speed "1" of the output node N2 to the reacting node N4 becomes a reverse speed line IR1. Here, a vertical line connecting the input node N5 to the first reverse sped line IR1 respective the first reverse speed line IR' becomes a reverse input speed line r1, realizing reverse shifting. That is, it can be noted that the input of the reverse speed is opposite to the output.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A gear train for an automatic transmission, comprising:
   a first planetary gear set comprising a first element variably connected to an input shaft, a second element variably connected to the first element, the input shaft and a transmission housing, and a third element engaged with a first transfer driven gear of a transfer shaft to transmit power to the transfer shaft;
   a second planetary gear set comprising a fourth element variably connected to the input shaft and the transmission housing, a fifth element fixedly connected to the first element of the first planetary gear set, and a sixth element engaged with a second transfer driven gear of the transfer shaft to transmit power to the transfer shaft; and
   friction means for variably connecting the first, second and fourth elements to either the input shaft or the transmission housing.

2. A gear train of claim 1 wherein the first planetary gear set is a single pinion planetary gear set.

3. A gear train of claim 1 wherein the first element is a first sun gear, the second element is a first ring, and the third element is a first carrier.

4. A gear train of claim 1 wherein the second planetary gear set is a single pinion planetary gear set.

5. A gear train of claim 1 wherein the fourth element is a sun gear, the fifth element is a ring gear, and the sixth element is a carrier.

6. A gear train of claim 3 wherein the fourth element is a second sun gear, the fifth element is a second ring gear, and the sixth element is a second carrier.

7. A gear train of claim 6 wherein the friction means comprise a first clutch interposed between the input shaft and the combination of the first sun gear and the second ring gear, a second clutch interposed between the second sun gear and the input shaft, a third clutch interposed between the first ring gear and the input shaft, a first brake interposed between the first ring gear and the transmission housing, and a second brake interposed between the transmission housing and the second sun gear.

8. A gear train of claim 7 wherein a first speed is realized by operating the first clutch and the first brake, a second speed is realized by operating the the first clutch and the second brake, a third speed is realized by operating the first and second clutches, a fourth speed is realized by operating the first and third clutches, a fifth speed is realized by the second and third clutches, a sixth speed is realized by operating the third clutch and the second brake, and a reverse speed is realized by operating the second clutch and the first brake.

* * * * *